(12) United States Patent
Norlund et al.

(10) Patent No.: US 9,491,710 B2
(45) Date of Patent: Nov. 8, 2016

(54) UPLINK TRANSMISSION POWER AND BIT RATE CONTROL

(75) Inventors: Krister Norlund, Gothenburg (SE); Anders Hansson, Gothenburg (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 18 days.

(21) Appl. No.: 14/407,383

(22) PCT Filed: Jul. 6, 2012

(86) PCT No.: PCT/EP2012/063227
§ 371 (c)(1),
(2), (4) Date: Jun. 13, 2015

(87) PCT Pub. No.: WO2014/005646
PCT Pub. Date: Jan. 9, 2014

(65) Prior Publication Data
US 2015/0312865 A1    Oct. 29, 2015

(51) Int. Cl.
*H04W 52/14* (2009.01)
*H04W 52/26* (2009.01)
(Continued)

(52) U.S. Cl.
CPC ......... *H04W 52/146* (2013.01); *H04W 52/26* (2013.01); *H04W 72/1268* (2013.01); *H04W 28/22* (2013.01); *H04W 52/20* (2013.01); *H04W 52/241* (2013.01); *H04W 52/265* (2013.01); *H04W 52/267* (2013.01);
(Continued)

(58) Field of Classification Search
CPC .................................................. H04W 52/146
See application file for complete search history.

(56) References Cited

U.S. PATENT DOCUMENTS

2003/0003921 A1* 1/2003 Laakso ............... H04W 52/343
455/453
2005/0047416 A1* 3/2005 Heo ........................ H04W 8/24
370/395.4
(Continued)

FOREIGN PATENT DOCUMENTS

WO         00/38348 A1      6/2000
WO      2006/004968 A2      1/2006
WO      2008/140389 A1     11/2008

OTHER PUBLICATIONS

PCT International Search Report, mailed Sep. 11, 2012, in connection with International Application No. PCT/EP2012/063227, all pages.
PCT Written Opinion, mailed Sep. 11, 2012, in connection with International Application No. PCT/EP2012/063227, all pages.

*Primary Examiner* — Brian D Nguyen
*Assistant Examiner* — Toan Nguyen
(74) *Attorney, Agent, or Firm* — Patents on Demand, P.A.; Brian K. Buchheit; Scott M. Garrett

(57) ABSTRACT

Joint uplink transmission power and bit rate control is provided. Data bits are received by a network Node B on an enhanced dedicated channel, E-DCH, from a user equipment, UE. End-user quality of service, QoS, for the received data bits is estimated. System coverage at a radio receiver of the network Node B is estimated. The estimated end-user QoS and the estimated system coverage represent a current working point of the UE. The current working point of the UE is related to a preferred working point. As a result thereof a transmission power control, TPC, command and a scheduling grant, SG, is determined for the UE so as to move the current working point towards the preferred working point and thereby adjust uplink transmission power and bit rate.

19 Claims, 4 Drawing Sheets

(51) Int. Cl.
  *H04W 28/22* (2009.01)
  *H04W 72/12* (2009.01)
  *H04W 88/08* (2009.01)
  *H04W 52/20* (2009.01)
  *H04W 52/32* (2009.01)
  *H04W 52/24* (2009.01)

(52) U.S. Cl.
  CPC .......... *H04W 52/325* (2013.01); *H04W 72/12* (2013.01); *H04W 88/08* (2013.01)

(56) References Cited

U.S. PATENT DOCUMENTS

| | | | | |
|---|---|---|---|---|
| 2007/0298825 | A1* | 12/2007 | Kayama | H04W 28/22 455/522 |
| 2008/0188232 | A1* | 8/2008 | Park | H04W 72/1231 455/450 |
| 2008/0276153 | A1* | 11/2008 | Shen | H03M 13/2957 714/790 |
| 2011/0268216 | A1* | 11/2011 | Rozenblit | H03G 3/001 375/295 |

* cited by examiner

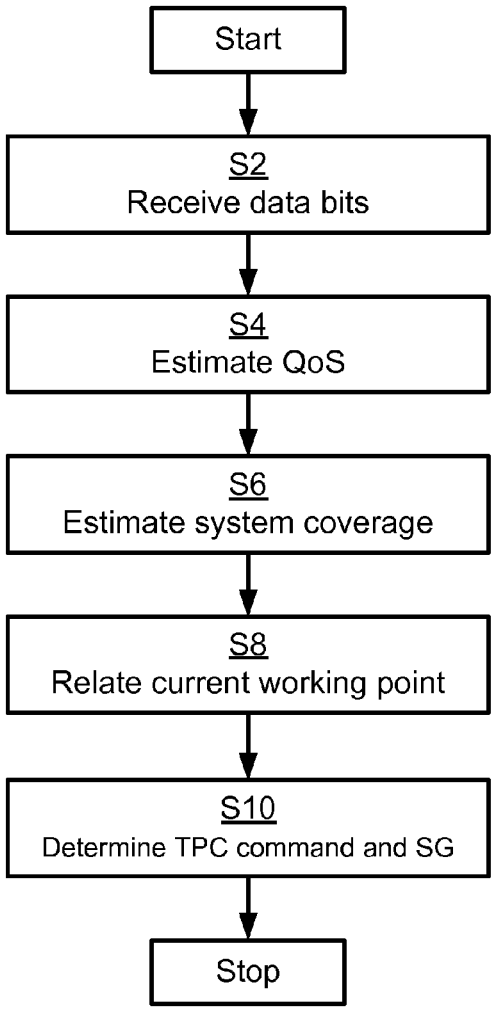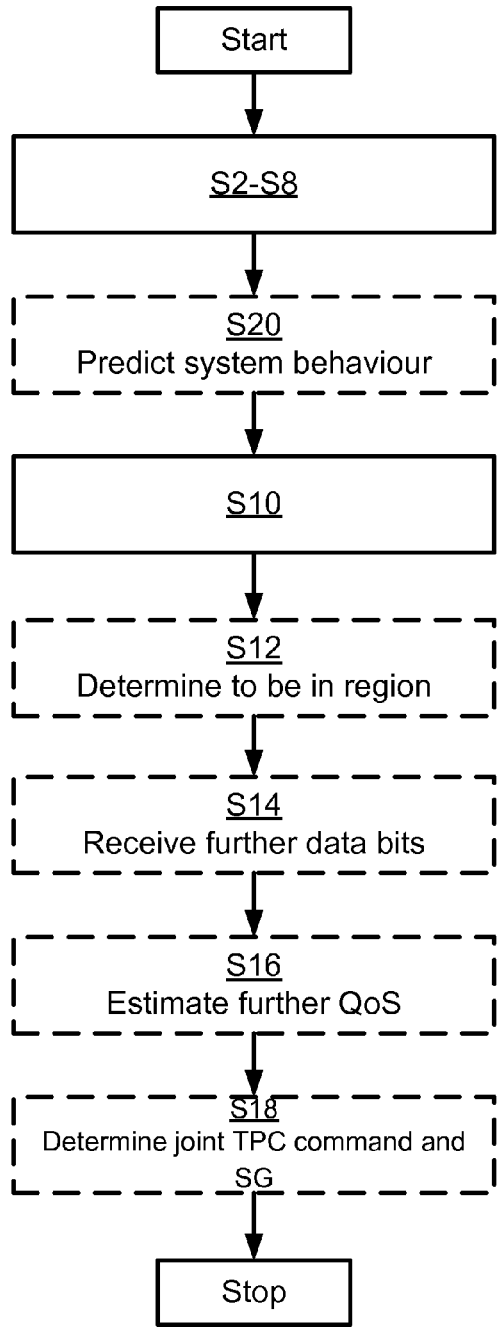
Fig. 7
Fig. 8

UPLINK TRANSMISSION POWER AND BIT RATE CONTROL

TECHNICAL FIELD

Embodiments presented herein relate to improvements of cell throughput of wireless systems, particularly to joint uplink transmission power and bit rate control.

BACKGROUND

In mobile communication networks, there is always a challenge to obtain good performance and capacity for a given communications protocol, its parameters and the physical environment in which the mobile communication network is deployed.

WCDMA (Wideband Code Division Multiple Access) is a radio access technology for packet-switched and circuit-switched services in mobile communication networks. In the uplink, all users in a cell share the same physical wireless channel (band).

FIG. 1 schematically illustrates part of a mobile communications system 1. Typically the mobile communications system 1 is compliant with the WCDMA system and in FIG. 1 those components involved in controlling the transmission power and transmission bit rate of User Equipment UE1 and UE2 in the uplink are illustrated. The network node, in WCDMA denoted Node B, is responsible for controlling the UE transmission power for the control channel, denoted Dedicated Physical Control Channel (DPCCH). The Node B typically strives for achieving a Signal-to-Interference and Noise Ratio (SINR) for the DPCCH that is close to a certain SINR target. The DPCCH contains pilot symbols that are known by the Node B and used by the Node B to estimate SINR in each slot (of length 0.67 ms). If the SINR is below the SINR target, the Node B decides that the UE's transmission power should be increased and if the SINR is above the SINR target the UE's transmission power should be decreased. The Node B communicates its decision by transmitting a single bit in each slot to the UE, the Transmission Power Control (TPC) command, which commands the UE to increase or decrease its transmission power of the DPCCH with a certain step size, e.g. 1 dB. This control loop is denoted Inner Loop Transmission Power Control (ILTPC) in FIG. 1. There is one control loop for each UE in the cell.

Node B is also responsible for scheduling (controlling) the bit rate of uplink data channels for packet-switched services, denoted Enhanced Dedicated Channels (E-DCHs). Let Raise-over-Thermal (RoT) be the total received power at the Node B receiver divided by the thermal noise in the Node B receiver. The total received power includes the interference from all UEs and the thermal noise at the receiver. The scheduler in the Node B typically tries to maximize the total throughput of all E-DCHs in the cell with a side constraint that the RoT should be less than a certain threshold. Yet another typical side constraint is that each UE should be granted a fair throughput compared with other UEs. The main reason for restricting RoT in a cell is to make sure that power limited UEs on the cell edge will be able to communicate with the Node B. RoT is in other words used as a measure for system coverage.

In order to decide the allowed transmission bit rate for each UE, or rather E-DCH, Node B first tries to estimate the RoT contribution for each control channel and data channel for each UE in the latest received frames or slots. A frame is either 2 ms or 10 ms. Furthermore, for each E-DCH, Node B tries to predict what the RoT contribution would be in the upcoming frame(s) for a set of preconfigured bit rates. The scheduler then assigns each E-DCH a bit rate such that the total predicted RoT is below the RoT threshold. Once the bit rates for the E-DCHs have been assigned, Node B transmits scheduling grants to the UEs. The scheduling grants SG (see FIG. 1) are transmitted to the UE on a control channel shared by all UEs in the cell. Scheduling grants are only transmitted when the assigned bit rate for an E-DCH changes. The scheduling grant is sent in the format of a power ratio between the DPCCH and E-DCH. This power ratio corresponds to a modulation and coding scheme and the modulation and coding scheme corresponds to a specific bit rate. If the ILTPC increases the transmitted power of DPCCH with 1 dB, the transmitted power of E-DCH is also increased with 1 dB, unless the UE is power limited. The scheduling grant loop is slow compared with the ILTPC loop.

For a given packet-switched service, the WCDMA system typically tries to achieve a certain Quality of Service (QoS). The QoS is typically measured in block error rate (BLER). For a packed-switched service the optimal BLER is often defined to be the BLER that achieves the maximum throughput (i.e. the achieved information bit rate). The SINR required to achieve a certain BLER for an E-DCH generally depends on a number of different factors. One factor is the transmitted bit rate of the E-DCH. In WCDMA a higher transmission bit rate (typically) requires a higher SINR. The goal of the Outer Loop Transmission Power Control (OLTPC) is to adjust the SINR target of the ILTPC such that a certain BLER or average number of Hybrid Automatic Repeat Request (HARQ) Transmission Attempts (TAs) is achieved.

For E-DCH, the decoding is performed at Node B. Node B sends information to the RNC (radio network controller) about successful and failed transmission attempts (based on CRC, cyclic redundancy check) together with the decoded data. If transmission attempts are successful, the RNC transmits a message to the Node B that instructs the Node B to decrease the SINR target of the ILTPC loop. If one or more transmission attempts failed, the RNC transmits a message to the Node B that instructs the Node B to increase the SINR target of the ILTPC loop. The OLTPC loop is slow compared with the ILTPC loop.

In view of the above there is a need for improved control loops.

SUMMARY

An object of embodiments herein is to improve the cell throughput in the uplink of wireless systems. Wireless systems for packet-switched services are typically designed to maximize the cell throughput given a side constraint on the RoT. As the characteristics of the wireless channels changes over time, it is in general difficult to estimate or predict what the maximum achievable cell throughput given a side constraint on RoT is for any wireless system. This means that most wireless systems use an algorithm that sometimes grant too high or too low transmission bit rates. Too high transmission bit rate leads to a high block error rate (BLER) and decreases the achieved cell throughput. Too low transmission bit rate leads to a system that is not fully utilized. Most wireless systems aim at finding an algorithm that on average performs well.

The inventors of the enclosed embodiments have through a combination of practical experimentation and theoretical derivation discovered that one problem with the current WCDMA system is that the complex dependencies between the control loops and UEs makes the system somewhat sensitive to estimation and prediction errors. The complex interaction between the control loops (OLTPC, ILTPC and SG) and the estimation errors in many cases leads to a system that takes a long time to converge to a good operating point. A particular object is therefore to provide joint uplink transmission power and bit rate control.

According to a first aspect a method of joint uplink transmission power and bit rate control is provided. The method is performed in a network Node B. According to the method data bits are received on an enhanced dedicated channel, E-DCH, from a user equipment, UE. End-user quality of service, QoS, for the received data bits is estimated. System coverage at a radio receiver of the network Node B is estimated. The estimated end-user QoS and the estimated system coverage represent a current working point of the UE. The current working point of the UE is related to a preferred working point. As a result thereof a transmission power control, TPC, command and a scheduling grant, SG, is determined for the UE so as to move the current working point towards the preferred working point and thereby adjust uplink transmission power and bit rate.

Advantageously this enables a high stable cell throughput to be achieved at the same time as each UE reaches a fair throughput and UEs at the cell edge still have coverage. The stable high cell throughput can be achieved without accurately estimating the maximum achievable cell throughput.

According to a second aspect a network Node B for joint uplink transmission power and bit rate control is provided. The network Node B comprises a receiver arranged to receive data bits on an enhanced dedicated channel, E-DCH, from a user equipment, UE. The network Node B further comprises a processing unit arranged to estimate end-user quality of service, QoS, for the received data bits. The processing unit is further arranged to estimate system coverage at a radio receiver of the network Node B. The estimated end-user QoS and the estimated system coverage represent a current working point of the UE. The processing unit is further arranged to relate the current working point of the UE to a preferred working point. The processing unit is further arranged to, as a result thereof, determine a transmission power control, TPC, command and a scheduling grant, SG, for the UE so as to move the current working point towards the preferred working point and thereby adjust uplink transmission power and bit rate.

According to a third aspect there is presented a computer program of joint uplink transmission power and bit rate control. The computer program comprises computer program code which, when run on a network node B, causes the network node B to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described, by way of non-limiting examples, references being made to the accompanying drawings, in which:

FIGS. 7 and 8 are flowcharts of methods according to embodiments.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
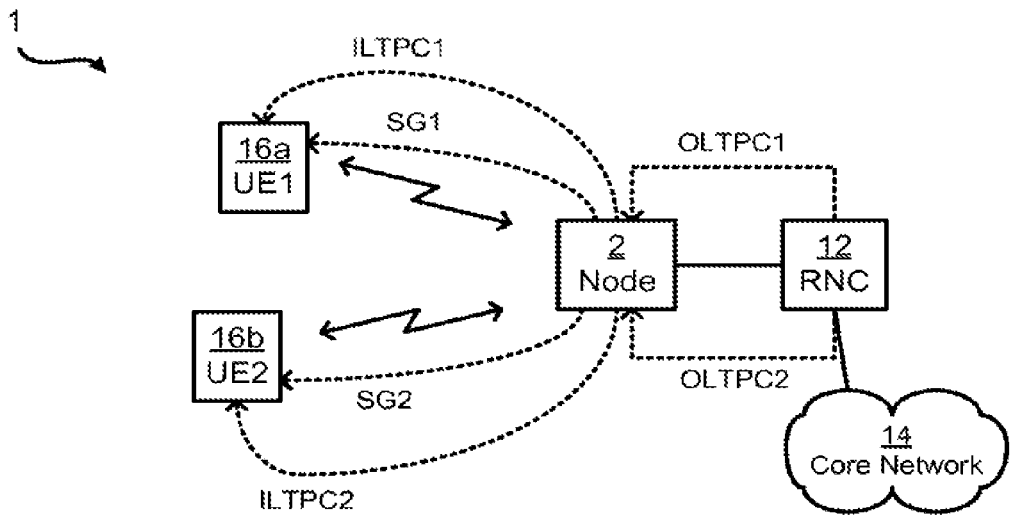
FIG. 1 is a schematic diagram illustrating a mobile communication network where embodiments presented herein may be applied.

FIG. 1 illustrates part of a mobile communications system 1. Typically the mobile communications system 1 is compliant with the WCDMA system. The mobile communications system 1 comprises a network node 2. Typically the network node 2 is a WCDMA and/or general UMTS (Universal Mobile Telecommunications System) so-called Node B. The Node B is a term used in UMTS equivalent to the BTS (base transceiver station) description used in the Global System for Mobile Communications (GSM). It is the hardware that is connected to the mobile phone network that communicates directly with the user equipment (UE) 16a, 16b.

In general terms the UE 16a, 16b represents any device used directly by an end-user to communicate in the mobile communications system 1. The UE 16a, 16b can take the form of a mobile communications terminal such as mobile telephone, a tablet or laptop computer equipped with a mobile broadband adapter, or any other device arranged to communicate with the network node 2. The network node 2 is operatively connected to a radio network controller (RNC) 12. In general terms, the RNC is a governing element in the UMTS radio access network (UTRAN) and is responsible for controlling the Node Bs that are connected to it. In turn, the RNC 12 is operatively connected to a core network 14.

In FIG. 1 also a number of control loops denoted OLTPC1, OLTPC2, ILTPC1, ILTPC2, SG1 and SG2 are illustrated. Commonly these control loops relate to the uplink signalling in a WCDMA system 1. The control loops denoted OLTPC, ILTPC and SG have been described above. The suffix 1 or 2 denotes with which UE a control loop is associated. Thus, ILTPC1 is the inner loop transmission power control for UE1 (represented by reference numeral 16a); ILTPC2 is the inner loop transmission power control for UE2 (represented by reference numeral 16b); OLTPC1 is the outer loop transmission power control for UE1, ILTPC2 is the outer loop transmission power control for UE2; SG1 is the scheduling grant loop for UE1 and SG2 is the scheduling grant loop for UE2.

Thus each UE is according to existing technology associated with three independent control loops. Further, the control loops of one UE are also independent of the control loops of another UE. The inventors of the enclosed embodiments have discovered that the three control loops for one UE affect each other. For example, if the network node 2 increases the allowed uplink bit rate by sending a new higher Scheduling Grant, SG, to one UE, say UE1, this UE1 will increase the transmission rate. In many cases this leads to an increase in the BLER. The RNC 12 will notice this increase and the average of the OLTPC1 SINR target will increase. The ILTPC1 will then start to operate around a higher average SINR target. The inventors of the enclosed embodiments have also discovered that the control loops for one UE, say UE1, will also affect the control loops for other UEs, say UE2, in the cell. For example, if the SINR target is increased for UE1, the ILTPC1 will start to operate around a higher SINR target. This means that the received power from UE1 increases and UE2 will be affected with a higher interference. As the interference has increased, the ILTPC2 of UE2 has to increase the transmission power in order to achieve the same SINR as before.

Further, the OLTPC is based on estimating the BLER performance based on checking if the CRC after decoding is ok or not ok.

The decisions for the different loops for one UE are made independently. A decision made for one of the loops for the UE will affect the situation for the other loops of the UE, but the other loops will not be able to know the reason for the change. Hence a potential problem is that the SG1 loop for UE1 will grant a transmission bit rate that can not be supported given the interference; the ILTPC1 loop might increase the ILTPC1 without ever being able to reach a target SINR.

Yet further, as noted above, a decision made for the ILTPC loop of one UE will affect the situation for the other UEs, but the other control loops will not be able to know the reason for the change. In other words, if the ILTPC1 loop increases the output power of UE1, the ILTPC2 loop of UE2 will notice a degradation in SINR but the ILTPC2 will not know if this degradation is due to increased interference or a fading dip. Hence a potential problem is that UE and UE2 will cause each other to consistently increase the power, leading to a power rush.

The enclosed embodiments generally concerns achieving a high stable uplink cell throughput. This may be achieved by performing joint uplink transmission power and bit rate control. In more detail, the enclosed embodiments are based on the understanding that end-user quality of service, QoS, and system coverage can be used to determine a transmission power control, TPC, command and a scheduling grant, SG, for the UE 16a, 16b.

Figure 2:
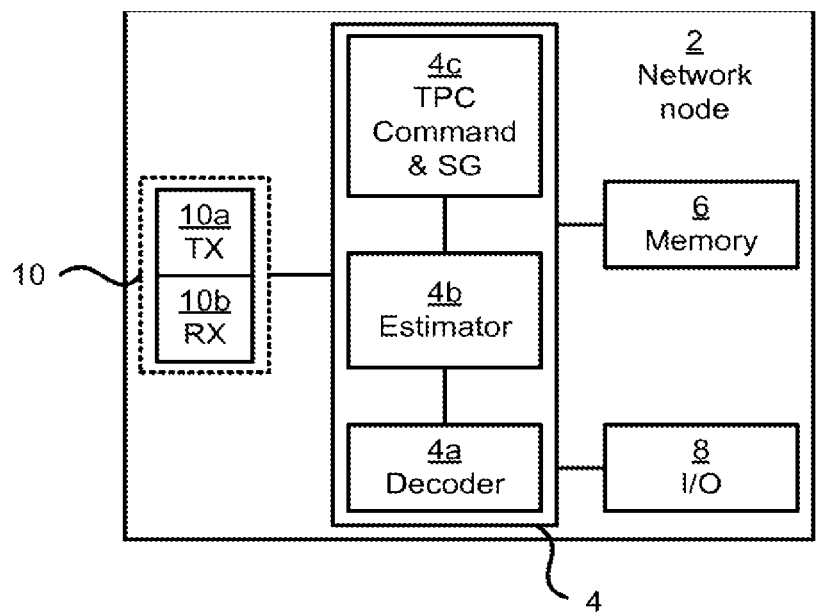
FIG. 2 is a schematic diagram showing functional modules of a network node.

Preferably the herein disclosed embodiments are implemented in a network node 2 (such as a Node B). FIG. 2 schematically illustrates a network node 2 in terms of a number of functional modules. The network node 2 comprises radio circuitry 10 for radio communications with the UE 16a, 16b. The radio circuitry 10 comprises a radio transmitter boa for transmitting radio signals and a radio receiver 10b for receiving radio signals. The network node 2 further comprises a processing unit 4. In general terms, the processing unit 4 is provided using any combination of one or more of a suitable central processing unit (CPU), multi-processor, microcontroller, digital signal processor (DSP), application specific integrated circuit (ASIC) etc., capable of executing software instructions stored in a computer program product 18 (as in FIG. 3), e.g. in the form of a memory 6. The processing unit 4 is thereby preferably arranged to execute methods as herein disclosed. The processing unit 4 may comprise a decoder module 4a arranged to decode a radio signal received by the radio receiver 10b, an estimator module 4b arranged to estimate properties of the decoded radio signal, and a TPC command and SG generator module 4c arranged to generate a TPC command and SG based on the estimated properties. The memory 6 may hold the computer program product 18. A network I/O interface 8 provides connectivity to the RNC 12.

The herein disclosed embodiments may readily apply to the system 1 of FIG. 1; the instructions transmitted to the UE 16a, 16b enclosed in the control loops are as such necessarily not changed; preferably only the control of the control loops is changed to enable joint uplink transmission power and bit rate control. The herein disclosed embodiments furthermore take advantage of the fact that in some mobile communications systems, such as in the WCDMA system, the network node 2, such as Node B, is enabled to control (or set a limit on) the transmission bit rate and power.

Figure 3:
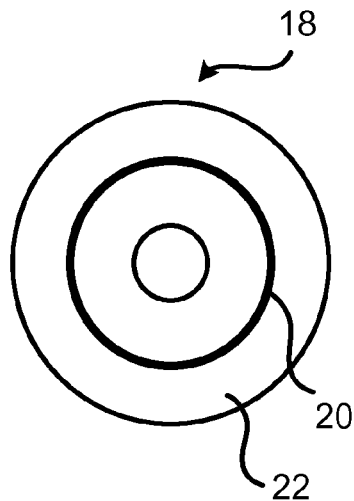
FIG. 3 shows one example of a computer program product comprising computer readable means.

A method of joint uplink transmission power and bit rate control will now be disclosed with references to the flowcharts of FIGS. 7 and 8 as well as the system 1 of FIG. 1 and the network node 2 of FIG. 2. The methods are preferably performed in the network node 2. The methods are advantageously provided as computer programs 18. FIG. 3 shows one example of a computer program product 18 comprising computer readable means 22. On this computer readable means 22, a computer program 20 can be stored, which computer program 20 can cause the processing unit 4 and thereto operatively coupled entities and devices, such as the memory 6, the I/O interface 8, the transmitter boa and the receiver 10b to execute methods according to embodiments described herein. In the example of FIG. 3, the computer program product 18 is illustrated as an optical disc, such as a CD (compact disc) or a DVD (digital versatile disc) or a Blu-Ray disc. The computer program product could also be embodied as a memory (RAM, ROM, EPROM, EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 18.

The radio receiver 10b of the network node 2 is arranged to in a step S2 receive data bits (comprised in a radio signal) on an enhanced dedicated channel, E-DCH, from a user equipment, UE 16a, 16b. The uplink transmission power and bit rate control is based on at least a first property and a second property of the received bits. The first property generally relates to end-user quality of service and the second property generally relates to system coverage. The (estimator 4b of the) processing unit 4 is therefore arranged to, in a step S4 estimate a first property of the received data bits, the first property preferably being end-user quality of service, QoS, for the received data bits. Preferably the QoS relates to at least one of BER (bit error rate), BLER, the reciprocal of SNR, the reciprocal of SINR, or the reciprocal of received UE power. The (estimator 4b of the) processing unit 4 is further arranged to, in a step S6 estimate a second property of the received data bits, the second property preferably being system coverage at a radio receiver 10b of the network node 2. Preferably the system coverage relates to at least one of RoT or other system coverage measures, such as RTWP (Received Total Wideband Power). As the skilled person understands, the resulting TPC command and/or the SG may vary depending on different combinations of the above disclosed properties.

As the skilled person also understands quantities of the above disclosed can be estimated in different ways.

For example, the RTWP can be estimated by first squaring and then summing the absolute value of the antenna samples.

To estimate RoT the thermal noise preferably needs to be estimated. The thermal noise can be estimated by first collecting statistics on the RTWP. From the collected statistics, one may generally observe time variations in the RTWP. The lowest values of the RTWP correspond to a situation with no traffic, i.e. a situation when the radio receiver 10*b* does not receive any radio traffic (and when the radio transmitter boa is silent), at which time only thermal noise contributes to the RTWP. Thus, the processing unit 4 may obtain an estimate on the thermal noise from the collected RTWP statistics. The RTWP statistics could be stored in the memory 6.

The SINR generally depends on the structure of the receiver 10*b*. For example, assume a single-user detector based on maximum-ratio combining (MRC). In such a case the SINR can be estimated as the squared L2-norm of the combining weights normalized by the thermal noise.

The estimated end-user QoS and the estimated system coverage may be said to represent coordinates of a current working point of the UE 16*a*, 16*b*. In a step S8 the current working point of the UE 16*a*, 16*b* is related to a preferred working point. The preferred working point is preferably associated with a target working region. A target working region corresponds to a collection of working points wherein the communications system 1 generally is considered to perform well. Different practical circumstances may determine what parameter values that are accepted for the communications system 1 to be considered to perform well.

For example, in terms of RoT the system is considered to work well when the RoT is above 15 dB and below 20 dB. For example, in terms of BLER the system is considered to work well when the BLER for each user is higher than $10^{-2}$ and below $10^{-1}$. Thus the preferred working point may be associated with a preferred BLER range and a preferred RoT range. Similarly, values of the other end-user QoS and system coverage parameters may be used to define other target working regions.

In a step S10 a TPC command and a SG is determined for the UE 16*a*, 16*b*. The TPC command and a SG are determined by the (TPC command and SG module 4*c* of the) processing unit 4 of the network node 2. The TPC command and the SG are dependent on how the current working point of the UE 16*a*, 16*b* relates to preferred working point. Particularly, the TPC command and the SG are chosen such that the current working point is moved towards the preferred working point. The uplink transmission power and bit rate are thereby adjusted. The transmission power is preferably the transmission power of an uplink dedicated physical control channel, DPCCH, of the UE. The determined TPC command is transmitted in the ILTPC and the SG is transmitted in the SG loop to the UE 16*a*, 16*b* by means of the radio circuitry 16 of the network node 2.

Prior to the step of determining the TPC command and the SG (step S10) behaviour of the system coverage may be predicted in a step S20. The TPC command and the SG in step S10 may then also be based on the predicted system coverage. The prediction is preferably determined by the processing unit 4 of the network node 2. Moreover, the bit rate is preferably the bit rate of the data bits transmitted by the UE 16*a*, 16*b* on the E-DCH. In this respect it should be mentioned that although the bit rate is to be controlled, the 3GPP WCDMA signals generally contain the maximum power difference between DPCCH and E-DCH. This implicitly means that the bit rate is limited.

Once the current working point is within the preferred working region the adjustment may only include toggling one of the commands. Thus, in a step S12 it is determined that the current working point is within a preferred end-user QoS range and a preferred system coverage range. The determination is preferably determined by the processing unit 4 of the network node 2. As a result thereof the uplink transmission power and bit rate controls are exclusively adjusted by toggling the TPC command. Thus, rather than finding a single optimal working point this may achieve stability once the preferred working region has been reached.

Figure 4:
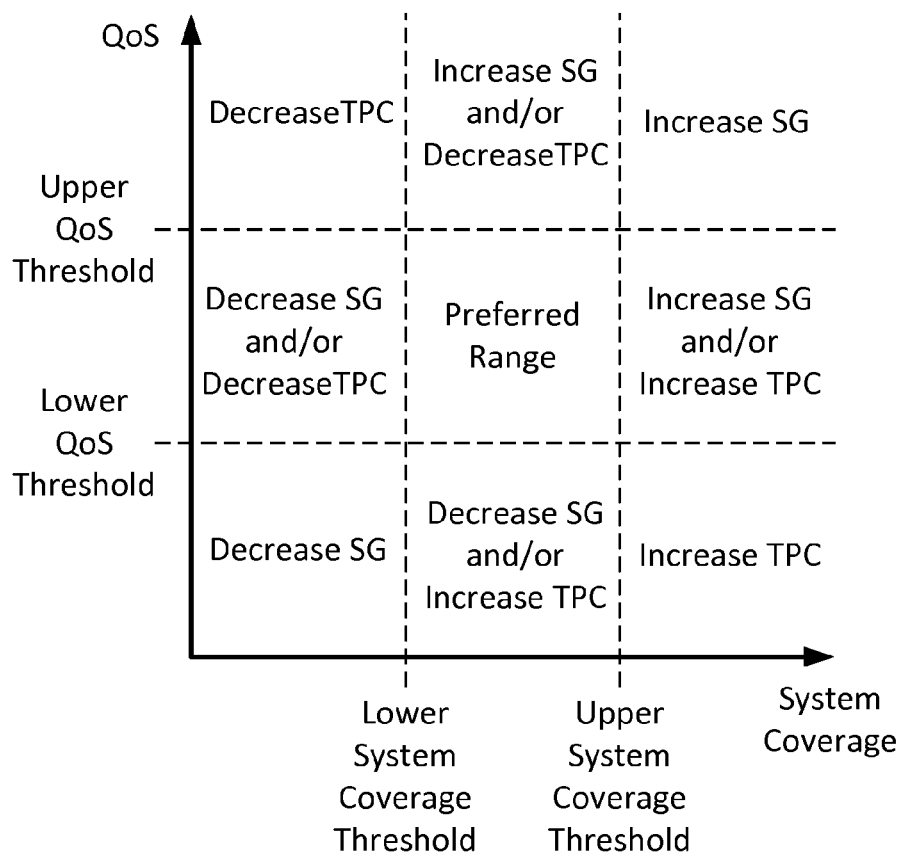
FIG. 4-6 schematically illustrate working ranges according to embodiments.

FIG. 4 illustrates an embodiment for one UE in a cell illustrating how the SG and TPC command could be related to the QoS and system coverage.

The empty region in the middle of the figure represents the preferred range and hence corresponds to the target working region. Hence one control goal is to, based on the estimated end-user QoS and system coverage, modify the bit rate and power output of the UE 16*a*, 16*b* such that the UE end up in the target working region. In order to do so the TPC command could either be increased or decreased and/or the SG could either be increased or decreased. Different actions may be made for the different situations. For example, if the estimated QoS for the UE 16*a*, 16*b* is below a lower QoS threshold and the estimated system coverage for the UE 16*a*, 16*b* is below the lower system coverage threshold, one control command option is to increase the SG for the UE 16*a*, 16*b*, thereby moving the current working point towards the preferred range. For example, increasing the SG will make the UE 16*a*, 16*b* transmit with a higher bit rate and this will typically decrease the system coverage and typically decrease the QoS for the UE 16*a*, 16*b*. This might lead to a transition into another region in the figure. Thus, generally speaking, the system coverage is inversely proportional to the SG. Thus, increasing the SG preferably results in the system coverage being decreased. Note that the system coverage is inversely proportional to the RoT. Also, the BLER is inversely proportional to the TPC. Thus, increasing the TPC preferably results in the BLER being decreased and hence the QoS being increased.

Note that ILTPC commands typically have to be transmitted each slot. Making a decision to not increase or decrease TPC means that the ILTPC commands are toggled.

As noted above, once the UE 16*a*, 16*b* has reached the target working region, it is preferred to keep the system stable by toggling the TPC commands and not change the SG.

As illustrated in FIG. 4, the action for the regions directly above, below, to the left and right of the preferred region may be associated with more than one control option. Any suitable control option may be chosen as long as the control option causes the current working point of the UE 16*a*, 16*b* to be moved towards the preferred region.

Figure 5:
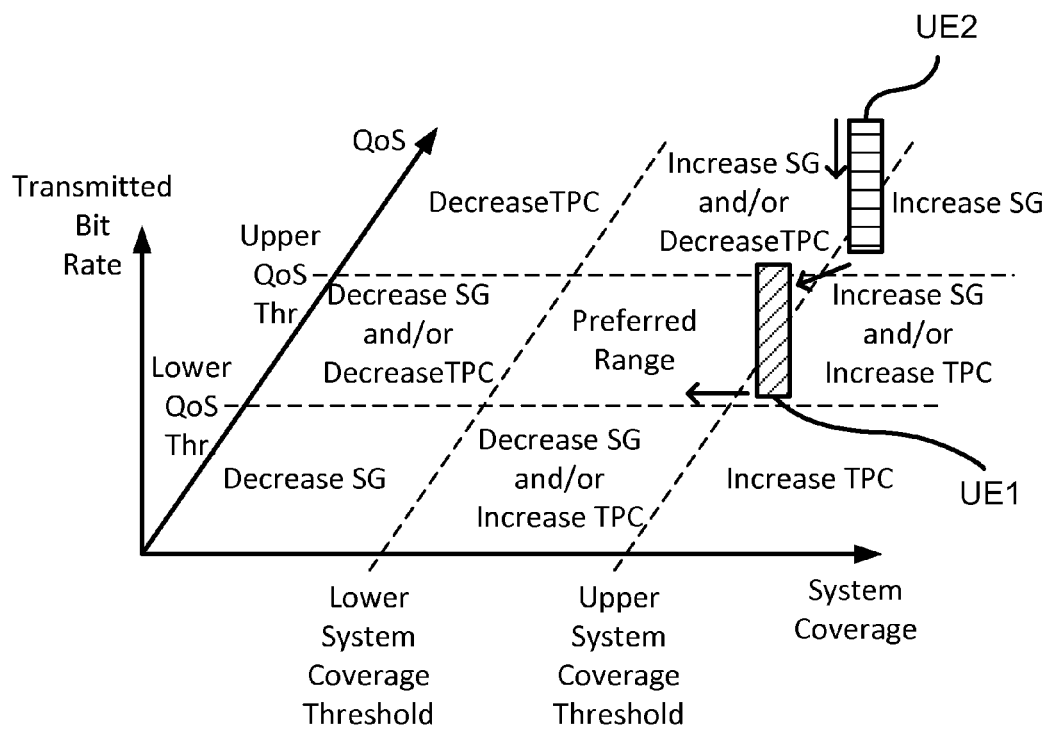

FIG. 5 illustrates an embodiment for two UEs; UE1 and UE2 in a cell illustrating how the SG and TPC command could be related to the QoS and system coverage. In a step S14 further data bits from a further UE (say, UE2) are received on the E-DCH. In a step S16 a further QoS for the further received data bits may then be estimated. The estimated further QoS and the estimated system coverage represent a further current working point of the further UE. In the example of FIG. 5, the system coverage is above the upper system coverage threshold for both UE1 and UE2. Additionally, UE2 is above the upper QoS threshold. The network node 2 preferably keeps track of the transmitted bit rate of the UEs as well as the SG for each UE. A joint decision for transmission power and bit rate for the UEs could therefore be based on both SG and the transmitted bit rate of the UEs. The TPC command and SG may, in a step S18, be determined jointly for the UE and the further UE based on the current working point for UE1 and the current working point for UE2. The joint decision made for the two UEs could, for example, be to increase the SG of the UE2 and send a TPC up command for UE1. The TPC command and the SG is thus determined jointly for UE1 and UE2, wherein TPC commands and SGs are determined for both UE1 and UE2 based on the current working point for UE1 and the current working point for UE2.

An alternative decision would be to only determine one control command for both UE1 and UE2, for example, only to increase the SG for UE1. The TPC command and/or the SG may thus be determined exclusively for one of UE1 and UE2, thereby leaving the uplink transmission power and bit rate for the other UE unadjusted. Alternatively, determining the TPC command and the SG jointly for UE1 and UE2 may instead comprise determining one single TPC command and/or one single SG for both UE1 and UE2.

As noted previously, one optimization criterion for the system is typically to optimize cell throughput with a side constraint on the RoT.

An additional side constraint could be to achieve throughput fairness between a plurality of (or even all) UEs within a cell. For example, assume that UE1 has a first current throughput and that UE2 has a second current throughput. The first current throughput and the second current throughput are generally dependent on the TPC command and/or the SG. The TPC command and/or the SG may then be adjusted so as to increase the first current throughput and/or the second current throughput.

Figure 6:
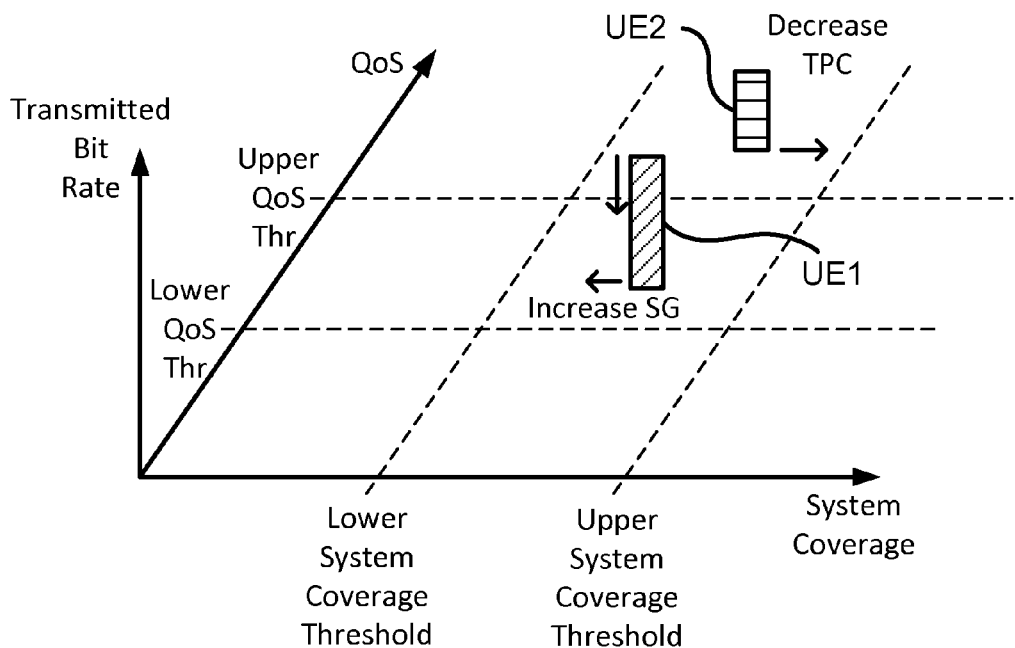

Consider that in the embodiment illustrated in FIG. 6, the system has an extra side constraint to strive for an equal throughput for all UEs. Assume further that UE2 has a lower SG than UE1. If the strategy is to improve (or even maximize) cell throughput and to strive for throughput fairness between UEs in addition to reach the preferred working range, one joint control command for UE1 and UE2 could be to increase the SG of the UE2 (but preferably not so much that the working point of UE1 ends up outside the preferred working range) and to send a TPC up command to UE2.

In summary, in order to obtain joint uplink transmission power and bit rate control the network node 2 is configured to perform a number of operations. For example, the network node 2 preferably uses RoT and BLER estimates to control the ILTPC and/or the scheduling grant loop. As noted above, the ILTPC and SG loops control the output power and transmission bit rate of the UEs. Alternatives to using RoT and BLER are, for example, RTWP (Received Total Wideband Power), UE received power, CRC check and/or SINR. The network node 2 is configured to making joint TPC and SG decisions. The joint decision is preferably made over all UEs and all loops. The network node 2 is thereby configured to changing the output power and transmission bit rate of the UEs such that the RoT and BLER (or any of the alternative measures) eventually falls within a region that is considered to be a good working region for the system.

The invention has mainly been described above with reference to a few embodiments. However, as is readily appreciated by a person skilled in the art, other embodiments than the ones disclosed above are equally possible within the scope of the invention, as defined by the appended patent claims. For example, although the disclosed embodiments have been related to two UEs 16a, 10, disclosed embodiments extend to any number of UEs served by a network node 2 in a cell of a mobile communications system 1.

The invention claimed is:

1. A method of joint uplink transmission power and bit rate control, the method being performed in a network Node B, comprising the steps of:
    receiving data bits on an enhanced dedicated channel (E-DCH) from a user equipment (UE),
    estimating end-user quality of service (QoS) for the received data bits;
    estimating system coverage at a radio receiver of the network Node B;
    wherein the estimated end-user QoS and the estimated system coverage represent a current working point of the UE;
    relating the current working point of the UE to a preferred working point; and as a result thereof:
    determining a transmission power control (TPC) command and a scheduling grant (SG) for the UE so as to move the current working point towards the preferred working point and thereby adjust uplink transmission power and bit rate; and
    determining that the current working point is within a preferred BLER range and a preferred RoT range and as a result thereof exclusively adjusting the uplink transmission power and bit rate control by toggling the TPC command.

2. The method according to claim 1, wherein the transmission power is the transmission power of an uplink dedicated physical control channel (DPCCH) of the UE.

3. The method according to claim 1, wherein the bit rate is the bit rate of the data bits transmitted by the UE on the E-DCH.

4. The method according to claim 1, wherein the end-user QoS is one from the group of bit error rate (BER), block error rate (BLER), signal to interference and noise ratio (SINR), and wherein the system coverage is Raise-over-Thermal (RoT) or Received Total Wideband Power (RTWP).

5. The method according to claim 4, wherein the RoT is the total received power at the network Node B receiver divided by the thermal noise in the network Node B receiver.

6. The method according to claim 1, wherein the preferred working point is associated with a preferred end-user QoS range and a preferred system coverage range.

7. The method according to claim 6, wherein the preferred end-user QoS range corresponds to a BLER between $10^{-2}$ and $10^{-1}$.

8. The method according to 6, wherein the preferred system coverage range corresponds to a RoT between 15 and 20 dB.

9. The method according to claim 1, wherein the system coverage is inversely proportional to the SG and the TPC.

10. The method according to claim 1, wherein the end-user QoS is proportional to the TPC and inversely proportional to the SG.

11. The method according to claim 1, further comprising:
receiving further data bits on the E-DCH from a further UE; and
estimating a further QoS for the further received data bits;
wherein the estimated further QoS and the estimated system coverage represent a further current working point of the further UE.

12. The method according to claim 11, further comprising:
determining the TPC command and the SG jointly for the UE and the further UE based on the current working point and the further current working point.

13. The method according to claim 12, wherein determining the TPC command and the SG jointly for the UE and the further UE comprises determining TPC commands and SGs for both the UE and the further UE based on the current working point and the further current working point.

14. The method according to claim 12, wherein determining the TPC command and the SG jointly for the UE and the further UE comprises determining one single TPC command and/or one single SG for both the UE and the further UE.

15. The method according to claim 12, wherein determining the TPC command and the SG jointly for the UE and the further UE comprises determining the TPC command and/or the SG exclusively for one of the UE and the further UE, thereby leaving the uplink transmission power and bit rate for the other UE unadjusted.

16. The method according to claim 1, wherein the UE has a first current throughput and the further UE has a second current throughput, wherein the first current throughput and the second current throughput are dependent on the TPC command and/or the SG, and wherein the TPC command and/or the SG are adjusted so as to increase the first current throughput and/or the second current throughput.

17. The method according to claim 1, further comprising, prior to the step of determining the TPC command and the SG:
predicting behaviour of the system coverage and determining the TPC command and the SG also based on the predicted system coverage.

18. A network Node B for joint uplink transmission power and bit rate control, comprising:
a receiver arranged to receive data bits on an enhanced dedicated channel (E-DCH) from a user equipment (UE);
a processing unit arranged to estimate end-user quality of service (QoS) for the received data bits;
the processing unit further being arranged to estimate system coverage at a radio receiver of the network Node B;
wherein the estimated end-user QoS and the estimated system coverage represent a current working point of the UE;
the processing unit further being arranged to relate the current working point of the UE to a preferred working point;
the processing unit further being arranged to, as a result thereof, determine a transmission power control (TPC) command and a scheduling grant (SG) for the UE so as to move the current working point towards the preferred working point and thereby adjust uplink transmission power and bit rate; and
the processing unit further being arranged to determine that the current working point is within a preferred BLER range and a preferred RoT range and as a result thereof exclusively adjusting the uplink transmission power and bit rate control by toggling the TPC command.

19. A non-transitory computer readable storage medium comprising a computer program of joint uplink transmission power and bit rate control, the computer program comprising computer program code which, when run on a network Node B, causes the network Node B to:
receive data bits on an enhanced dedicated channel (E-DCH) from a user equipment (UE);
estimate end-user quality of service (QoS) for the received data bits;
estimate system coverage at a radio receiver of the network Node B;
wherein the estimated end-user QoS and the estimated system coverage represent a current working point of the UE;
relate the current working point of the UE to a preferred working point; and as a result thereof:
determine a transmission power control (TPC) command and a scheduling grant (SG) for the UE so as to move the current working point towards the preferred working point and thereby adjust uplink transmission power and bit rate; and
determine that the current working point is within a preferred BLER range and a preferred RoT range and as a result thereof exclusively adjusting the uplink transmission power and bit rate control by toggling the TPC command.

* * * * *